April 24, 1945. C. V. MILLIKAN 2,374,557
OIL WELL TESTING DEVICE
Filed Oct. 5, 1942 3 Sheets—Sheet 3
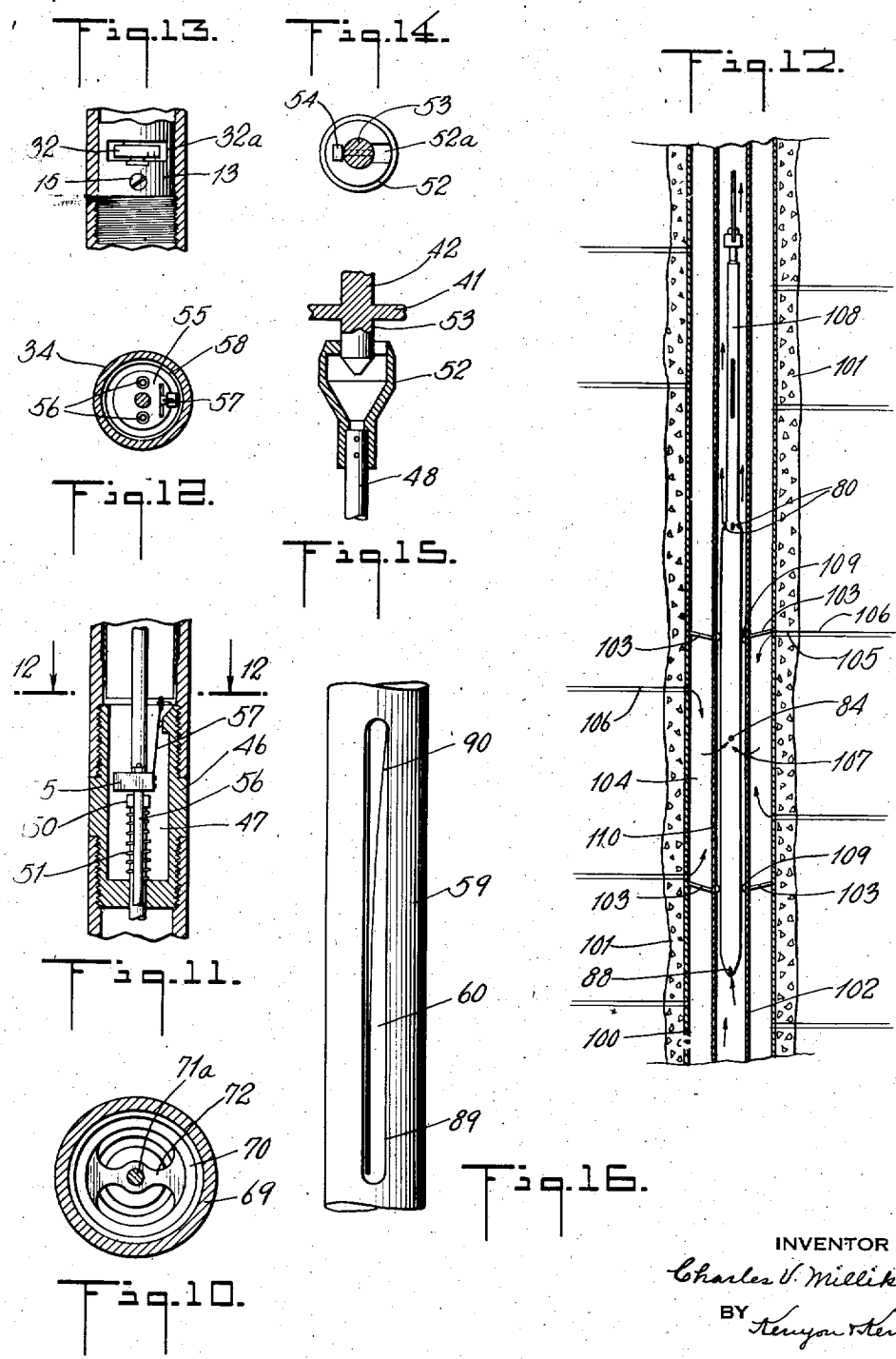
INVENTOR
Charles V. Millikan
BY Kenyon & Kenyon
ATTORNEYS Patented Apr. 24, 1945

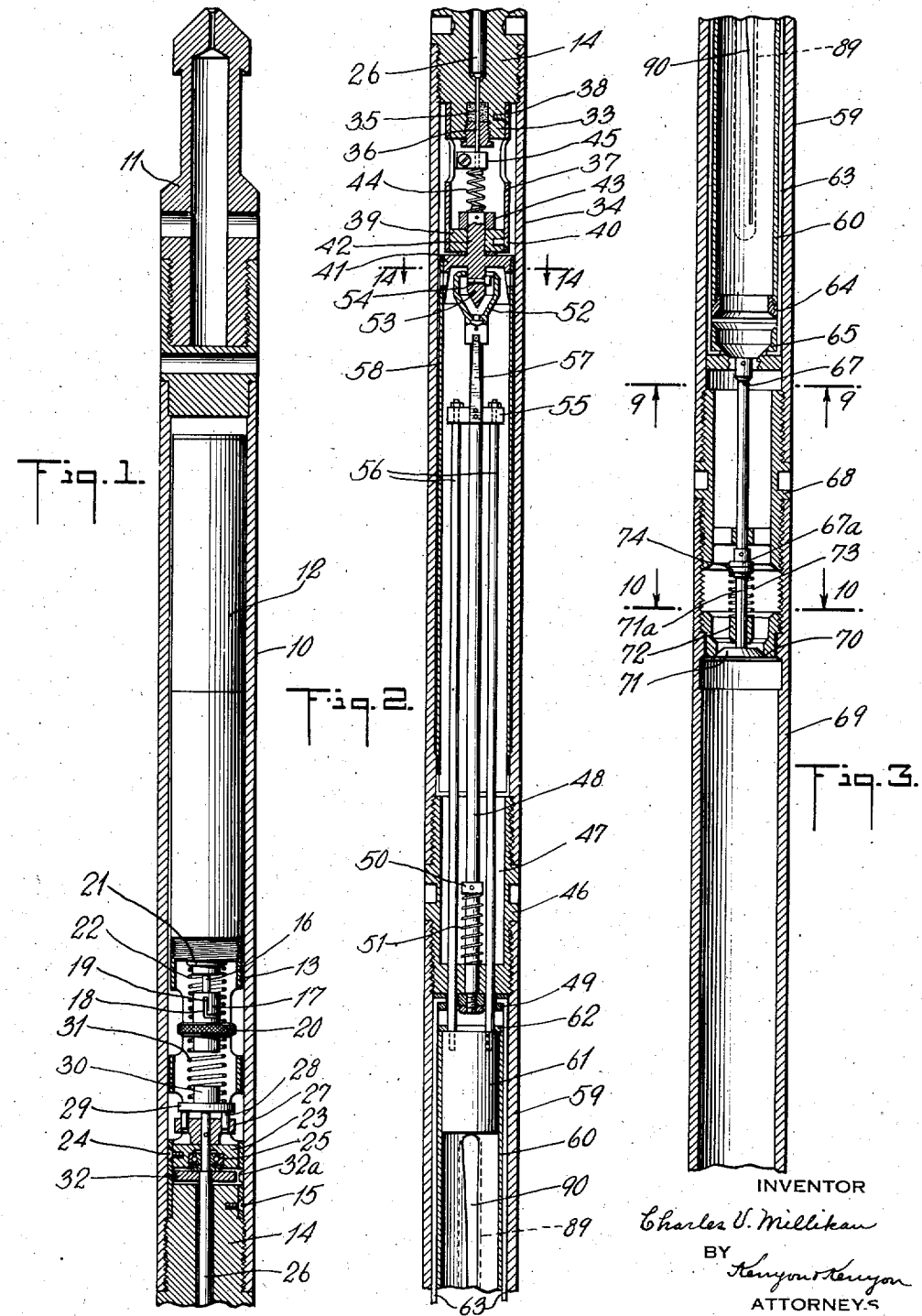

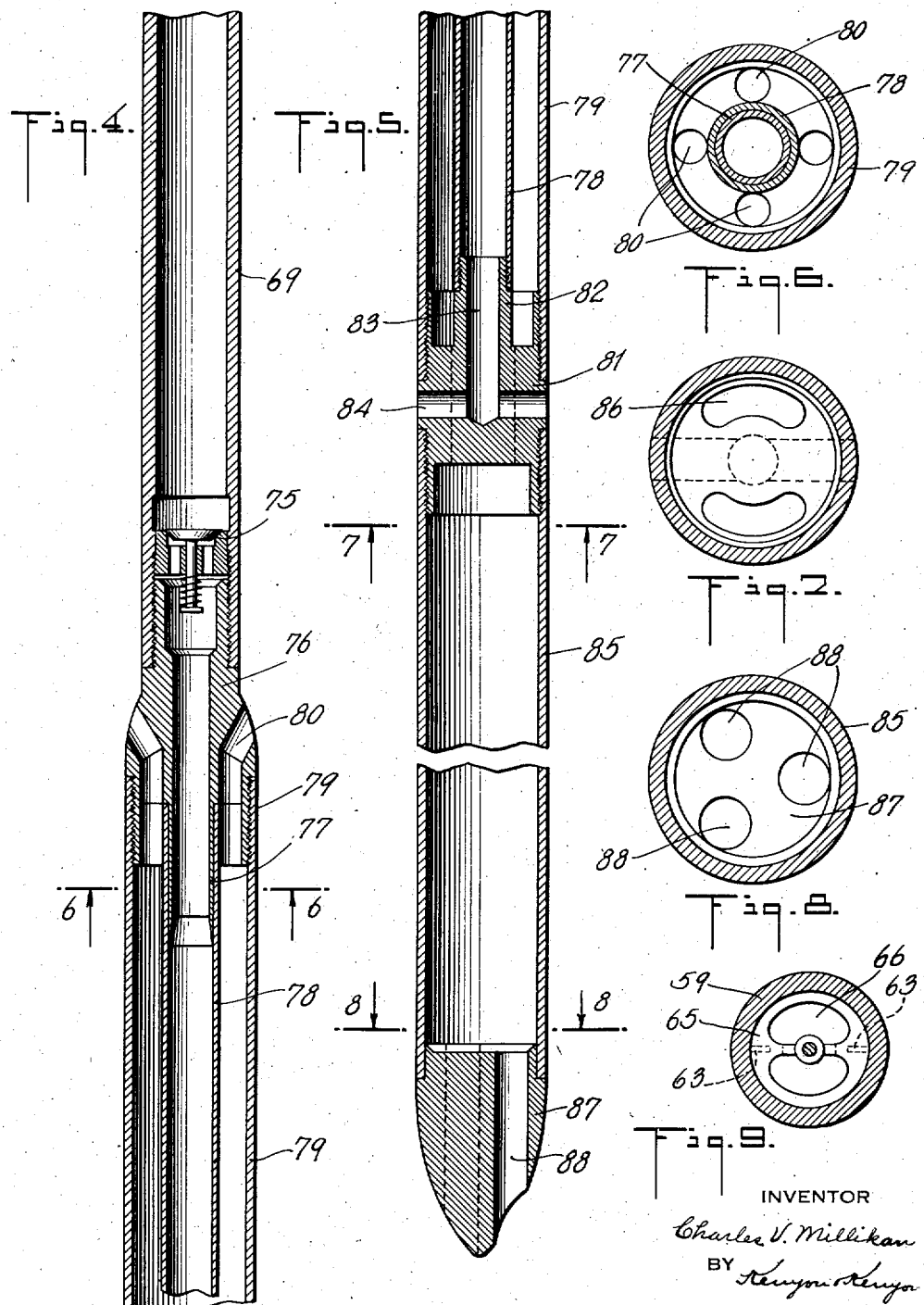

2,374,557

UNITED STATES PATENT OFFICE 2,374,557

OIL WELL TESTING DEVICE

Charles V. Millikan, Tulsa, Okla., assignor to Geophysical Research Corporation, New York, N. Y., a corporation of New Jersey Application October 5, 1942, Serial No. 460,769

8 Claims. (Cl. 137—18)

This invention relates to oil well testing devices.

In applicant's co-pending application, Ser. No. 455,295, filed August 19, 1942, there is disclosed a procedure for separately testing different sections of an oil-producing zone in a well which is producing in the normal manner for the purpose of determining the nature of the fluid being obtained from each individual section.

An object of this invention is an instrument by means of which the procedure just referred to may be performed efficiently and expeditiously at a comparatively low equipment cost and operating expense.

Other objects, novel features and advantages of this invention will become apparent from the following specification and accompanying drawings, wherein:

Figs. 1, 2, 3, 4 and 5 are enlarged sectional views respectively of successive portions of the instrument shown in elevation in Fig. 17;

Fig. 6 is a section on the line 6—6 of Fig. 4;

Figs. 7 and 8 are sections on the lines 7—7 and 8—8 of Fig. 5;

Figs. 9 and 10 are sections on the lines 9—9 and 10—10 of Fig. 3;

Fig. 11 is a fragmentary section similar to Fig. 2 but at right angles thereto;

Fig. 12 is a section on the line 12—12 of Fig. 11;

Fig. 13 is a fragmentary section similar to Fig. 1 but at right angles thereto;

Fig. 14 is a section on the line 14—14 of Fig. 2, but with a different arrangement of parts;

Fig. 15 is a fragmentary section similar to Fig. 2 but with a different arrangement of parts;

Fig. 16 is a fragmentary side elevation at the same level as the lower portion of Fig. 2, and Fig. 17 is a sectional view through a well in which is arranged an instrument embodying the invention.

As shown in Fig. 1, a pipe 10 is closed at its upper end by a hoisting plug 11 and contains clock mechanism enclosed in a casing 12, the lower end of which is threaded. A slotted tube 13 is screwed on to the threaded end of the casing 12 and is closed at its lower end by a plug 14 threaded into the end of the pipe 10 and having a projection to which the tube 13 is attached by a screw 15. The drive shaft 16 of the clock mechanism projects from the casing 12 a short distance into the tube 13. A sleeve 17 is slidably mounted on the shaft 16 and is provided with a slot 18 having a longitudinal portion and a transverse portion into which slot projects a pin 19 mounted on the shaft 16. The sleeve 17 is provided with a collar 20 between which and a collar 21 on the shaft 16 near the end of the casing 12 is arranged a helical spring 22 surrounding the shaft 16 and sleeve 17. The spring 22 is of the expansion type and normally tends to hold the sleeve 17 in the position shown in Fig. 1 with the pin 19 in contact with the upper end of the longitudinal portion of the slot 18. However, the sleeve 17 may be moved upwardly against the pressure of the spring 22 to bring the transverse portion of the slot 18 into register with the pin 19 so that the sleeve 17 may be rotated slightly to locate the pin 19 in the transverse portion of the slot and thus lock the sleeve 17 in elevated position. A plug 23 is arranged in the tube 13 above the plug 14 and is held in place by a screw 24. In the plug 23 is provided a thrust bearing 25 which mounts a driven shaft 26 extending through the plug 14 and beyond the upper surface of the plug 23. A collar 27 is pinned to the upper end of the shaft 26 and is provided with a circular series of longitudinal holes into which extend studs 28 projecting from a plate 29 having a central boss 30. A torque spring 31 is interposed between the collar 20 and the plate 29 with one end fitting over and fixed to the boss 30 and the other end fitting over and fixed to the portion of the sleeve 17 extending below the collar 20. A wheel or disk 32 is mounted on the shaft 26 between the plugs 14 and 23 and is provided on its rim with indicia visible through a slot 32a in the tube 13 with the pipe 10 disconnected and removed from the plug 14.

Referring now to Fig. 2, the plug 14 has a boss 33 of smaller diameter than the plug itself and the boss 33 extends into a pipe 34, the upper end of which is threaded on to the lower end of the plug 14. The driven shaft 26 has a portion 35 of reduced diameter projecting beyond the lower end of the boss 33 and around which a liquid-tight seal is provided by the stuffing box and packing 36. A slotted tube 37 has its upper end fitting over the boss 33 and is attached thereto by a screw 38. In the lower end of the tube 37 is arranged a plug 39 held in place by a screw 40. A head 41 in the pipe 34 has a shaft 42 extending through the plug 39 and held in place by a collar 43 pinned thereto, the collar, shaft and head being rotatable with respect to the plug 39. A helical spring 44 has one end attached to the shaft 42 and is provided at its upper end with a clamp 45 by which the upper end of the spring is fixed to the portion 35 of the drive shaft 26. The lower end of the pipe 34 is closed by a plug 46 in the upper portion of which is provided a recess 47. A rod 48 is slidably supported by the plug 46 axially thereof and extends upwardly into the pipe 34. The lower end of the rod 48 projects beyond the base of the plug 46 and is provided with a head 49 which limits upward movement of the rod. On the rod 48 is fixed a collar 50 between which and the bottom of the recess 47 is mounted a helical spring 51 tending to move the rod 48 upward to bring the head 49 into contact with the lower face of the plug 46. At its upper end, the rod 48 is provided with a hollow portion 52 into which projects a stud 53 extending from the lower face of the head 41. The upper surface of the portion 52 is closed except for an axial bore through which the stud 53 extends and a radial slot 52a (Fig. 14). The stud 53 is equipped with a pin 54 (Fig. 14) of suitable size and arrangement to pass through the slot when alined therewith and upon axial movement of the rod 48. Normally, the rod 48 is at a sufficiently lower position than that shown in Fig. 2 to locate the pin 54 above the portion 52 and the shaft 42 is oriented sufficiently to maintain the pin 54 out of alinement with the radial slot 52a. A disk 55 (Figs. 11 and 12) is slidably mounted on the rod 48 and two rods 56 extend downwardly from the cross-bar 55 through the plug 46 and through holes in the head 49. A stylus 57 (Figs. 11 and 12) is supported by the disk 55 and is adapted to engage a chart supported on the interior surface of a cylindrical chart holder 58 attached to the head 41 and extending nearly to the bottom of the pipe 34. A pipe 59 has its upper end threaded to the lower end of the plug 46 and within the pipe 59 is a cylinder 60. A piston 61 is slidably mounted in the cylinder 60 and is attached to the lower ends of the rods 56, upward movement of the piston being limited by an annular stop 62 at the upper end of the cylinder 60. Rods 63 arranged in longitudinal grooves in the periphery of the cylinder 60 have their upper ends attached to the head 49.

As shown in Fig. 3, a ring 64 is threaded to the lower end of the cylinder 60 and a slidable member 65 is arranged in the pipe for movement relative to the ring 64. The member 65 is attached to the lower ends of the rods 63 (Fig. 9). The member 65 has apertures 66 and is attached to a rod 67 which projects downwardly beyond the end of the pipe 59 and has a head 67a. A hollow connector 68 joins a pipe 69 to the pipe 59 and receives the rod 67. A valve seat 70 is threaded into the upper end of the pipe 69 and is arranged to co-operate with a lift valve 71 having a stem 71a engaged by the lower end of the rod 67. A cross-bar guide member 72 (Fig. 10) is provided in the valve seat 70 and a helical spring 73 is arranged between the member 72 and a collar 74 on the valve stem 71a, the spring 73 tending to move the valve 71 into closed position.

At the lower end of the pipe 69 is provided a spring-actuated check valve 75 (Fig. 4) for the purpose of preventing escape of liquid from the pipe 69 through the bottom end thereof. A hollow plug 76 is threaded into the lower end of the pipe 69 and the portion of 76 below the bottom edge of the pipe 69 is of somewhat greater diameter than the pipe 69. The plug 76 has a small diameter central boss 77 to which is attached a small diameter pipe 78. A larger diameter pipe 79 surrounds the pipe 78 and is attached to the plug 76 flush with the larger diameter portion thereof. Ducts 80 provide outlets from the annular space between the pipes 78 and 79 (Fig. 6). The lower end of the pipe 79 is closed by a plug 81 (Fig. 5) having a small diameter boss 82 to which is attached the lower end of the pipe 78. In the boss 82 is provided an axial passageway 83 terminating in a plurality of radially arranged passageways 84. A pipe 85 has its upper end attached to the lower end of the plug 81 and the plug is provided with passageways 86 providing communication between the interior of the pipe 85 and the annular space between the pipes 78 and 79. The lower end of the pipe 85 is closed by a conical shape plug 87 having passageways 88 providing communication between the exterior and the interior of the pipe 85.

As shown in Figs. 2 and 16, the pipe 59 and the cylinder 60 are provided with registering slots 89 and 90 respectively, the upper end of each slot being below the position of the bottom of the piston 61 when in its uppermost position and the bottom of each slot being above the position of the bottom of the piston 61 when in its lowermost position. The slot 90 preferably expands upwardly for a purpose later to be pointed out, although it may be of uniform width the same as the slot 89.

In Fig. 17 is illustrated the use of the instrument just described in a well equipped with a perforated steel casing or liner, for the purpose of determining the nature of fluid being obtained from different sections of the oil-producing zone and the rate at which the fluid is flowing fro meach section. In this figure, 100 is a standard steel liner set into the well with cement 101 in the usual manner. Within the liner 100 is a discharge tube 102 which is equipped at intervals with packing rings 103 which contact the inner surface of the liner 100 to form annular chambers 104. While the spacing of the packing rings 103 may be varied, it has been found that a spacing of approximately three feet is satisfactory. The liner 100 is provided with the usual apertures 105 communicating through passages 106 with the strata surrounding the well, these apertures and passageways being formed in the usual manner after the liner has been set in place by bullets shot from a special gun lowered into the liner. The discharge tube 102 is provided with one or more apertures 107 between each pair of packing rings 103 to provide communication between each chamber 104 and the interior of the discharge tube. Within the discharge tube 102 is arranged the testing instrument 108 described previously in this specification with reference to Figs. 1 to 16 inclusive. On the inner wall of the discharge tube 102 are provided pack-off rings 109 which are spaced apart approximately the same distance as the packing rings 103 and are located closely adjacent such packing rings. Each pair of pack-off rings 109 forms an annular chamber 110 with the surface of the lower enlarged portion of the instrument 108 when the instrument is so arranged that the enlarged portion contacts both rings of the pair. The rings 109 are so designed that the enlarged portion of the testing instrument 108 fits them snugly but the instrument is capable of movement relative thereto so that it may be placed in and removed from the discharge tube. When in the position shown in Fig. 17, the passageways 84 communicate with a single chamber 110 and a single chamber 104 while the passageways 88 are located below the bottom ring 109 of the pair. Fluid from that portion of the discharge tube 102 below the instrument enters the instrument through the passageways 88 while fluid from a single chamber 104 passes into the instrument through passageways 84 by way of the apertures 107 and a single chamber 110.

Before the instrument 108 is lowered into the well, the piston 61 rests on the collar 64 at the bottom of the cylinder 60 and the cross-bar 55, together with the stylus 57 are located in the recess 47 as shown in Fig. 11. The rod 48 is depressed sufficiently against the action of the spring 51 to locate the top surface of the portion 52 below the pin 54 and the head 41 is sufficiently oriented to misaline the pin 54 with the slot 52a thereby maintaining the rod 48 in its depressed position. The valve 71 (Fig. 3) is held out of contact with the valve seat 70 through the medium of the head 49, rods 63, sliding member 65, push rod 67 and valve stem 71a. The clock mechanism in the casing 12 is set in operation just before the instrument is lowered into the well and rotates the head 41 at a slow speed, the speed of one rotation in four hours having been found satisfactory. By an arrangement subsequently to be described, the head 41 is set at an orientation which will cause alinement of the pin 54 with the slot 52a after a predetermined length of time.

When the instrument is lowered into the well with the surface of its enlarged portion contacting two pairs of pack-off rings 109, the fluid from the well below the lower pack-off ring 109 flows through the passageways 88 into the pipe 85, through the passageways 86 into the annular space between the pipes 78 and 79 and out through the passageways 80 into the discharge tube 102 above the upper pack-off ring 109. Fluid from the chamber 110 flows through the passageways 84 and 83 into the pipe 78 and thence through the passageway 77 and the check valve 75 into the pipe 69. From the pipe 69 the fluid flows around the valve 71 into the connector 68 and through the passageways 66 into the cylinder 60 to engage the bottom surface of the piston 61 and move the piston 61 upwardly to uncover the lower ends of the slots 90 and 89. The piston 61 moves upwardly until the rate of flow through the slots 90 and 89 equals the rate of flow into the instrument through the pasasgeways 84. The upward movement of the piston 61 produces corresponding movement of the disk 55 and stylus 57, thus causing the stylus to produce a trace on the chart carried by the chart holder 56, the chart and its holder being rotated at the same speed as the head 41. The trace on the chart is a record of the rate of flow through the slot 90 during the time the instrument is in operation. When the pin 54 reaches alinement with the slot 52a, the rod 48 is released for upward movement by the spring 51 to lift the push rod 67 through the medium of the head 49, rods 63 and slidable member 65 to permit the spring 73 to lift the valve 71 into closed position thereby preventing further flow through the instrument. The check valve 75 is effective to retain liquid in the pipe 69 upon removal of the instrument from the well to provide a fluid sample which may be removed from the instrument for analysis purposes.

The length of time that the valve 71 is held open is regulated by initial orientation of the stud 53 with respect to the portion 52 with the pipe 10 disconnected and removed from the plug 14. In order to effect such orientation, the part composed of the sleeve 17 and the collar 20 is raised from the position shown in Fig. 1 and rotated counterclockwise to locate the pin 19 in the transverse portion of the slot 18. Such movement of the sleeve 17 retracts the pins 28 from the collar 27, thus permitting rotation of the stud 53 to the desired orientation with respect to the portion 52. The indicia on the disk 32 are suitably calibrated to indicate the time which would be required to rotate the shaft 26 from any given position to a position in which the pin 54 is in alinement with the slot 52a. Therefore, by rotation of the shaft 26 through the medium of the wheel 32 or otherwise until the proper setting is indicated by the wheel 32, any desired period of valve-open condition may be selected. After such selection has been made, the collar 20 is turned in clockwise direction until the pin 19 is in the longitudinal portion of the slot 18, after which the pins 28 are re-engaged in holes in the collar 27.

The slot 90 is formed of upwardly expanding configuration for the purpose of having the extent of movement of the piston proportional to the rate of flow on a logarithmic scale rather than on a linear scale. If a linear scale is desired, the slot 90 should be of uniform width from top to bottom.

Preferably, the chart on which the stylus makes its trace comprises a soft copper sheet. The stylus is a steel pin which scratches or embosses a line in the copper sheet as it moves along the same. The chart holder is not sealed off from the fluids so that the chart may be immersed in fluid while the record is being made and it is for this reason that the copper sheet is used for the chart.

I claim:

1. Apparatus of the character described comprising a chamber having inlet and outlet ports, a check valve for said inlet port, an outlet port lift valve movable to closed position in the direction of fluid flow through said outlet port, biasing means tending to close said lift valve, a non-rotatable slidable member operable in one position to hold open said lift valve, a non-slidable rotating member, and inter-engageable means on said rotatable and slidable members for maintaining the latter in position to hold open said lift valve, said means being disengaged in one position of said rotatable member relative to said slidable member to permit said lift valve to close, and means for driving said rotatable member.

2. Apparatus of the character described comprising a chamber having inlet and outlet ports, a check valve for said inlet port, an outlet port lift valve movable to closed position in the direction of fluid flow through said outlet port, biasing means tending to close said lift valve, a non-rotatable slidable member operable in one position to hold open said lift valve, a non-slidable rotating member, means for driving said rotatable member, said slidable member having a bore to receive one end of said rotatable member and a keyway communicating with said bore, and a radial projection on said rotatable member adapted to be received in said keyway by movement of said slidable member upon alinement of said projection and keyway.

3. Apparatus of the character described comprising a chamber having inlet and outlet ports, a check valve for said inlet port, an outlet port lift valve movable to closed position in the direction of fluid flow through said outlet port, a non-rotatable slidable member operable in one position to hold open said lift valve, a non-slidable rotating member, and inter-engageable means on said rotatable and slidable members for maintaining the latter in position to hold open said lift valve, said means being disengaged in one position of said rotatable member relative to said slidable member to permit said lift valve to close, and means for driving said rotatable member.

4. Apparatus of the character described comprising a chamber having inlet and outlet ports, a check valve for said inlet port, an outlet port lift valve movable to closed position in the direction of fluid flow through said outlet port, a non-rotatable slidable member operable in one position to hold open said lift valve, a non-slidable rotating member, means for driving said rotatable member, said slidable member having a bore to receive on end of said rotatable member and a keyway communicating with said bore, and a radial projection on said rotatable member adapted to be received in said keyway by movement of said slidable member upon alinement of said projection and keyway.

5. Apparatus of the character described comprising a chamber having inlet and outlet ports, a check valve for said inlet port, an outlet port lift valve movable to closed position in the direction of fluid flow through said outlet port, a non-rotatable slidable member operable in one position to hold open said lift valve, a non-slidable rotating member, means for driving said rotatable member, one of said members having a bore to receive one end of the other member and a keyway communicating with said bore, and a radial projection on said other member adapted to be received in said keyway by movement of said slidable member upon alinement of said projection and keyway.

6. Apparatus of the character described comprising a chamber having inlet and outlet ports, a check valve for said inlet port, an outlet port lift valve movable to closed position in the direction of fluid flow through said outlet port, biasing means tending to close said lift valve, a non-rotatable slidable member operable in one position to hold open said lift valve, a non-slidable rotating member, means for driving said rotatable member, one of said members having a bore to receive one end of the other member and a keyway communicating with said bore, and a radial projection on said other member adapted to be received in said keyway by movement of said slidable member upon alinement of said projection and keyway.

7. Apparatus of the character described comprising a chamber having inlet and outlet ports, a check valve for said inlet port, an outlet port lift valve movable to closed position in the direction of fluid flow through said outlet port, a non-rotatable slidable member operable in one position to hold open said lift valve, a non-slidable rotating member, means for driving said rotatable member, one of said members having a bore to receive the end of said other member, a keyway in one of said members and a radial projection on the remaining member adapted to be received in said keyway by movement of said slidable member upon alinement of said projection and keyway.

8. Apparatus of the character described comprising a chamber having inlet and outlet ports, a check valve for said inlet port, an outlet port lift valve movable to closed position in the direction of fluid flow through said outlet port, biasing means tending to close said lift valve, a non-rotatable slidable member operable in one position to hold open said lift valve, a non-slidable rotating member, means for driving said rotatable member, one of said members having a bore to receive the end of said other member, a keyway in one of said members and a radial projection on the remaining member adapted to be received in said keyway by movement of said slidable member upon alinement of said projection and keyway.

CHARLES V. MILLIKAN.

CERTIFICATE OF CORRECTION.

Patent No. 2,374,557.                          April 24, 1945.

CHARLES V. MILLIKAN.

It is hereby certified that error appears in the printed specification of the above numbered patent requiring correction as follows: Page 4, first column, line 18, claim 4, for "on end" read --one end--; and that the said Letters Patent should be read with this correction therein that the same may conform to the record of the case in the Patent Office.

Signed and sealed this 31st day of July, A. D. 1945.

Leslie Frazer (Seal)                                      Acting Commissioner of Patents.

tion to hold open said lift valve, a non-slidable rotating member, and inter-engageable means on said rotatable and slidable members for maintaining the latter in position to hold open said lift valve, said means being disengaged in one position of said rotatable member relative to said slidable member to permit said lift valve to close, and means for driving said rotatable member.

4. Apparatus of the character described comprising a chamber having inlet and outlet ports, a check valve for said inlet port, an outlet port lift valve movable to closed position in the direction of fluid flow through said outlet port, a non-rotatable slidable member operable in one position to hold open said lift valve, a non-slidable rotating member, means for driving said rotatable member, said slidable member having a bore to receive on end of said rotatable member and a keyway communicating with said bore, and a radial projection on said rotatable member adapted to be received in said keyway by movement of said slidable member upon alinement of said projection and keyway.

5. Apparatus of the character described comprising a chamber having inlet and outlet ports, a check valve for said inlet port, an outlet port lift valve movable to closed position in the direction of fluid flow through said outlet port, a non-rotatable slidable member operable in one position to hold open said lift valve, a non-slidable rotating member, means for driving said rotatable member, one of said members having a bore to receive one end of the other member and a keyway communicating with said bore, and a radial projection on said other member adapted to be received in said keyway by movement of said slidable member upon alinement of said projection and keyway.

6. Apparatus of the character described comprising a chamber having inlet and outlet ports, a check valve for said inlet port, an outlet port lift valve movable to closed position in the direction of fluid flow through said outlet port, biasing means tending to close said lift valve, a non-rotatable slidable member operable in one position to hold open said lift valve, a non-slidable rotating member, means for driving said rotatable member, one of said members having a bore to receive one end of the other member and a keyway communicating with said bore, and a radial projection on said other member adapted to be received in said keyway by movement of said slidable member upon alinement of said projection and keyway.

7. Apparatus of the character described comprising a chamber having inlet and outlet ports, a check valve for said inlet port, an outlet port lift valve movable to closed position in the direction of fluid flow through said outlet port, a non-rotatable slidable member operable in one position to hold open said lift valve, a non-slidable rotating member, means for driving said rotatable member, one of said members having a bore to receive the end of said other member, a keyway in one of said members and a radial projection on the remaining member adapted to be received in said keyway by movement of said slidable member upon alinement of said projection and keyway.

8. Apparatus of the character described comprising a chamber having inlet and outlet ports, a check valve for said inlet port, an outlet port lift valve movable to closed position in the direction of fluid flow through said outlet port, biasing means tending to close said lift valve, a non-rotatable slidable member operable in one position to hold open said lift valve, a non-slidable rotating member, means for driving said rotatable member, one of said members having a bore to receive the end of said other member, a keyway in one of said members and a radial projection on the remaining member adapted to be received in said keyway by movement of said slidable member upon alinement of said projection and keyway.

CHARLES V. MILLIKAN.

CERTIFICATE OF CORRECTION.

Patent No. 2,374,557.   April 24, 1945.

CHARLES V. MILLIKAN.

It is hereby certified that error appears in the printed specification of the above numbered patent requiring correction as follows: Page 4, first column, line 18, claim 4, for "on end" read --one end--; and that the said Letters Patent should be read with this correction therein that the same may conform to the record of the case in the Patent Office.

Signed and sealed this 31st day of July, A. D. 1945.

Leslie Frazer (Seal)   Acting Commissioner of Patents.